Figure 1:
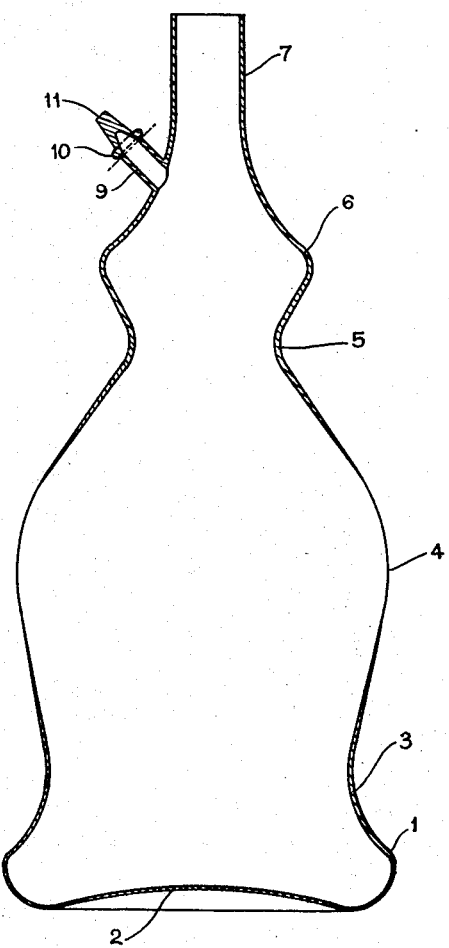

May 11, 1965   P. NATAF   3,182,861
BOTTLE MADE OF A PLASTIC MATERIAL
Filed Nov. 30, 1961

Inventor
PAUL NATAF
By Toulmin & Toulmin
Attorneys

United States Patent Office 3,182,861
Patented May 11, 1965

3,182,861
BOTTLE MADE OF A PLASTIC MATERIAL
Paul Nataf, 54 Rue de Sablonville,
Neuilly-sur-Seine, France
Filed Nov. 30, 1961, Ser. No. 155,903
Claims priority, application France, Dec. 9, 1960,
846,486
2 Claims. (Cl. 222—212)

The present invention relates to a bottle or a flask made of a supple plastic material, particularly of polyethylene. Experience has shown that when it is desired to make with this material a bottle having a cylindrical body and a rather large capacity, of, for instance one liter or more, it is necessary to give to the wall made of plastics a thickness of one millimeter at least, to obtain a holding and particularly a satisfactory stability, said thickness corresponding for a bottle of one liter to a weight of about 80 grams.

It has already been proposed to make with polyethylene bottles in which the wall has a small thickness in the central portion of the body and a greater thickness in the portions constituting the bottom and the spout. It has also been proposed to give to these bottles a profile which is undulating in axial section to increase its rigidity, but the gain is of little importance.

The present invention relates to a bottle made of polyethylene, having a weight much lower than the known bottles and having nevertheless a perfect stability. It is characterized in that the wall, about at its middle height, offers a bulging connected with an enlarged seat of the bottle by a lengthened concave portion.

According to a preferred form of realization, the seat of the bottle has in section a rounded edge.

The bottle according to the invention has an excellent stability and does not tend to "brake," like a bag or a leather bottle when it is filled up with a liquid.

These particulars of the bottle according to the invention are easily obtained by making this bottle according to a known process which consists in starting from a small length of a tube, having about the same diameter as the spout and a length equal to the height of the bottle to be obtained. This tube is introduced, when heated, in a hollow mold made in two parts and is applied against the wall of this mold by an expansion or by a swelling with compressed air, the bottom of this mold including means to grip and weld the lower end of the tube thus introduced: this process allows to obtain automatically the variations of thickness above mentioned for the wall of the bottle, since these thicknesses are the smaller as the diameter of the corresponding section is the greater. Preferably, this process is worked up by means of a machine also already known, in which a rover producing a continuous tube made of plastic material is associated with the molding device above described.

Figure 2:
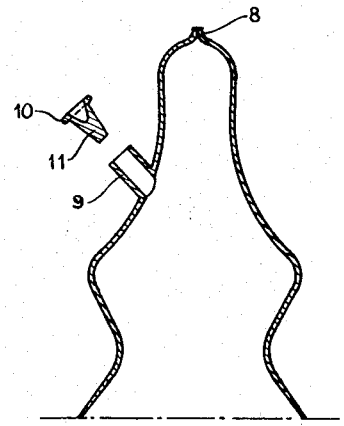

By way of example, a form of embodiment of the bottle according to the invention is described hereafter with reference to the annexed drawing in which:

FIGURE 1 illustrates an axial section of the bottle.
FIGURE 2 illustrates an axial section of a pouring device, in the position of use, which can advantageously be mounted on the bottle.

As shown in the drawing, the bottle is undulated in shape and possesses a body made of a plastic material, the wall of which has an extremely small thickness: this body presents a double curve: a curve 1 blending into the bottom 2 and followed by a shrinkage or concavity 3 blending into a median curve or bulging 4, which has a maximum diameter equal to the diameter of the lower curve 1 and is situated at a height above the bottom equal to the base diameter of the bottle. From the bulging 4, the bottle contracts to form a neck 5, the thickness of the wall of the bottle increasing in proportion to the decrease of the diameter. The neck 5 is followed by a third curve 6 blending into the cylindrical spout 7 and all the upper part of the bottle from the neck has a sufficient thickness to supply a rigidity which allows to hold it conveniently with the hand and to pour its content, the curve 6 preventing the bottle from slipping from the hand.

When the bottle has been filled up, the spout 7 is closed by a welding, 8. To prevent the use of a special plug which should become necessary if the bottle was opened by the cutting of the welded end of the spout, a pouring device is provided on the bulging 6: this device is constituted by a side tube 9 provided at the molding of the bottle and having a bead 10 and a solid conical extension 11. For the first use, the tube 9 is cut along the dotted line illustrated in FIGURE 2, flush with the bead 10 and the conical extension 10 is used, after being turned as shown in FIGURE 2, as a plug for the pouring nozzle 9 thus formed.

What is claimed is:

1. A bottle comprising a body of a flexible plastic material, a spout extending from the upper portion of said body, and a tube laterally extending from the lower portion of said spout and defining a pouring device, the portion of the bottle below the lateral extension flaring outwardly and downwardly and then curving inwardly and downwardly forming a constriction in the bottle just above the body thereof, said tube having a conical solid extension on the outer end thereof and a bead at the bottom of said solid extension whereby said solid extension can be cut off below the bead and inserted into the open end of the tube to define a plug.

2. A bottle comprising a body of a flexible plastic material, said body having a bottom which is rounded at its outer periphery with the wall of said bottom being relatively thick, an outwardly curved bulge in the central portion of said body with the wall of said bulge being relatively thin, said body having an inwardly curved portion smaller in diameter than said bulge and said bottom interconnecting said bulge and bottom with said interconnecting portion having a relatively thick wall, a spout extending from the upper portion of said body with said spout having a relatively thick wall, a tube laterally extending from the lower portion of said spout and defining a pouring device, a conical solid extension on the outer end of said tube and a bead at the bottom of said solid extension whereby said solid extension can be cut off below the bead and inserted into the open end of the tube to define a plug.

References Cited by the Examiner
UNITED STATES PATENTS

| D. 45,187 | 2/14 | Ebeling. | |
|---|---|---|---|
| 2,613,110 | 10/52 | Spingarn | 239—175 X |
| 2,742,202 | 4/56 | Dresden et al. | 222—563 X |
| 2,784,882 | 3/57 | Du Bois | 222—211 X |
| 2,951,264 | 9/60 | Bailey | 222—207 X |

FOREIGN PATENTS

| 1,052,417 | 9/53 | France. |
|---|---|---|
| 1,204,664 | 8/59 | France. |

LOUIS J. DEMBO, Primary Examiner.
LAVERNE D. GEIGER, Examiner.